US007661459B2

(12) United States Patent
Wesley et al.

(10) Patent No.: US 7,661,459 B2
(45) Date of Patent: Feb. 16, 2010

(54) MOBILE SERVING CART AND SYSTEM INCORPORATING SAME

(75) Inventors: Mark Edward Wesley, San Diego, CA (US); Timothy Andrew Birkmann, Corona, CA (US); Brian Douglas Stamm, Seal Beach, CA (US)

(73) Assignee: B/E Aerospace, Inc., Wellington, FL (US)

( * ) Notice: Subject to any disclaimer, the term of this patent is extended or adjusted under 35 U.S.C. 154(b) by 585 days.

(21) Appl. No.: 11/607,731

(22) Filed: Dec. 1, 2006

(65) Prior Publication Data

US 2008/0120187 A1    May 22, 2008

Related U.S. Application Data

(60) Provisional application No. 60/860,638, filed on Nov. 21, 2006.

(51) Int. Cl.
*B60H 1/00* (2006.01)
(52) U.S. Cl. .................. 165/11.1; 165/202; 165/919
(58) Field of Classification Search ............... 165/11.1, 165/11.2, 202, 203, 204, 918, 919
See application file for complete search history.

(56) References Cited

U.S. PATENT DOCUMENTS

| | | |
|---|---|---|
| 3,908,749 A | 9/1975 | Williams |
| 5,069,273 A | 12/1991 | O'Hearne |
| 5,975,202 A | 11/1999 | Grandi |
| 6,272,394 B1 | 8/2001 | Lipps |
| 6,344,630 B1 | 2/2002 | Jarvis et al. |
| 2001/0007323 A1 | 7/2001 | Clothier et al. |
| 2003/0005830 A1 | 1/2003 | Citterio et al. |
| 2004/0186760 A1 | 9/2004 | Metzger |
| 2004/0194811 A1 | 10/2004 | Carhuff et al. |
| 2004/0233055 A1 | 11/2004 | Canich et al. |
| 2005/0028543 A1 | 2/2005 | Whitehead et al. |
| 2005/0077806 A1 | 4/2005 | Schellenberg |
| 2005/0193760 A1 | 9/2005 | Moran et al. |
| 2006/0085308 A1 | 4/2006 | Metzger |
| 2006/0097876 A1 | 5/2006 | Retali et al. |

*Primary Examiner*—Ljiljana (Lil) V Ciric
(74) *Attorney, Agent, or Firm*—Drinker Biddle & Reath LLP

(57) ABSTRACT

A mobile cart for serving food and/or beverages is described. According to various implementations, the cart is equipped with a removable mission module. The mission module includes equipment that is used by the cart to perform its designated mission, such as an oven (for a hot food service mission module), a cooling unit (for a cold food service mission module), a beverage dispenser (for a beverage service mission module), a point of sale terminal (for duty-free service mission module), appropriate branding (for a franchising mission), or a custom equipment (for a customized mission). The mission module also includes a processor and a memory. The mission module is removable, and may be one of several mission modules available to the cart. Thus, for each type of mission, there may be a different mission module. This enables the cart to be quickly and easily "customized" for each mission by replacing an unneeded module with a required one.

23 Claims, 7 Drawing Sheets

MOBILE SERVING CART AND SYSTEM INCORPORATING SAME

CROSS-REFERENCE TO RELATED APPLICATIONS

This application claims the benefit of the filing date of U.S. Provisional Application 60/860,638, filed Nov. 21, 2006, which is incorporated herein by reference in its entirety.

TECHNICAL FIELD

The invention relates generally to food and beverage service and, more particularly, to serving devices, systems and methods in which a mobile cart electronically stores maintenance, operational, or financial data.

BACKGROUND

Ideally, when a business needs to serve food and beverages, the customers are conveniently located at tables, a large kitchen with a staff is located nearby, and there are enough servers to deliver the food quickly and efficiently to the customers. However, there are many scenarios in which such conditions do not exist. In such scenarios, many businesses end up using carts to serve food and beverages. One example is a sidewalk food concession cart. Another example is a room service cart in a hotel. Still another example is a galley cart on an airline, bus, or cruise ship. On an airline, for example, food and beverages need to be selected that are appropriate for the length of the trip and delivered to the aircraft just prior to flight time. On the aircraft itself, there are additional obstacles to overcome when serving food and beverages, including limited space and few personnel available to serve. Furthermore, the food has to be heated or chilled during the flight. This requires that the aircraft have enough ovens and refrigerators to heat and/or store food. On flights that are not full, some of the oven and refrigeration equipment goes unused, and simply takes up space and weight, and wastes fuel. Another challenge for serving food and beverages on a plane is all of the appropriate regulations must be complied with. For example, galley carts on airlines have to be sanitized after use according to the standards set forth by the governmental agencies worldwide. Also, regulations require that airline food be stored at certain temperatures from the time of preparation to the time of service. Failure to do so can result in civil liability if passengers get sick.

To summarize, serving food and beverages using serving carts presents its own set of challenges. These include properly outfitting and stocking the carts for missions to which they are assigned, keeping track of where carts are, knowing what kind of food they are carrying, tracking when they were last sanitized, and keeping a record of the temperature at which the contents of the carts are maintained. It can thus be seen that there is a need for a serving cart that addresses these challenges.

SUMMARY

In accordance with the foregoing, a mobile catering cart is provided. According to an embodiment of the invention, the cart includes a docking port and a removable module communicatively linked to the docking port. The removable module is configured for a particular mission for the cart, and includes a memory that stores information regarding the identity of the cart. The removable module also includes a processor that retrieves the information and transmits the information to a docking station via the docking port.

Another embodiment of the invention is a catering system that includes a food and beverage cart, a docking station, a computer network, and a remotely located computer. The docking station and the remotely located computer are communicatively linked to the computer network. According to this embodiment, the food and beverage cart includes a removable module having a processor and a memory that stores information regarding the cart, and a docking port communicatively linked to the removable module. The docking station is coupled to the docking port, receives the information from the memory via the docking port, and transmits the information to the remotely located computer via the computer network.

In yet another embodiment of the invention, a method for managing a cart to be used in catering to customers, includes the steps of transporting the cart to a multiple locations, including a place at which the customers are located; storing, in a computer-readable memory of the cart, information regarding tasks performed at one or more of the locations; retrieving the information from the memory at a docking station at one or more of the locations; and transmitting the information to a remotely-located computer.

Still another embodiment of the invention is a system for serving food that includes a mobile cart having a cold service mode and a hot service mode, a first removable module, a second removable module, a docking station, a computer network, and a remote computer. The cart has a data port, a power port, a compartment that stores food, and a receptacle linked to the data port and the power port. The first removable module has a cooling unit, a processor and a memory communicatively linked to the processor. When the cart is in the cold service mode, the first removable module is disposed in the receptacle and is communicatively linked to the data port and electrically linked to the power port so that data is sent and received by the processor via the data port and electricity is received by the processor via the power port, and the cooling unit cools the receptacle. The second removable module has a heating unit, a processor and a memory communicatively linked to the processor. When the cart is in the hot service mode, the second removable module is disposed in the receptacle and is communicatively linked to the data port and electrically linked to the power port so that data is sent and received by the processor via the data port and electricity is received by the processor via the power port, and heating unit heats the receptacle. The docking station, which is external to the cart, has a power source and a data connection that link to the power port and data port of the cart when the cart is docked at the docking station. The remote computer is communicatively linked to the computer network, and information from the memory of the first or second removable module is transmitted via the docking station and the computer network to the remote computer. The information includes the identity of the cart.

DETAILED DESCRIPTION

The invention is generally directed to a mobile cart for serving food and/or beverages. According to various embodiments of the invention, the cart is equipped with a removable mission module. The mission module includes equipment that is used by the cart to perform its designated mission, such as an oven (for a hot food service mission module), a cooling unit (for a cold food service mission module), a beverage dispenser (for a beverage service mission module), or a point of sale terminal (for duty-free service mission module). The mission module also includes a processor and a memory. The mission module is removable, and may be one of several mission modules available to the cart. Thus, for each type of mission, there may be a different mission module. This enables the cart to be quickly and easily "customized" for each mission by replacing an unneeded module with a required one. The cart also has an external docking port. The docking port may have connections for power, data, air, water, waste air, and waste water. At each stage in the catering process, the cart may be hooked up via the docking port or "docked" to a docking station. Using a computer terminal (which may be a data server) at the docking station, service personnel can extract information from the memory and enter information into the memory regarding various aspects of the catering process, including maintenance data, operational data, and financial data. In one embodiment, the cart automatically transmits this information to the docking station upon being docked, without any prompting from a user. The terminal is, in turn, linked to a network, and can transmit information regarding the cart and the stage of the catering process that the cart is currently undergoing to a logistics center and/or to a global services center.

Figure 1:
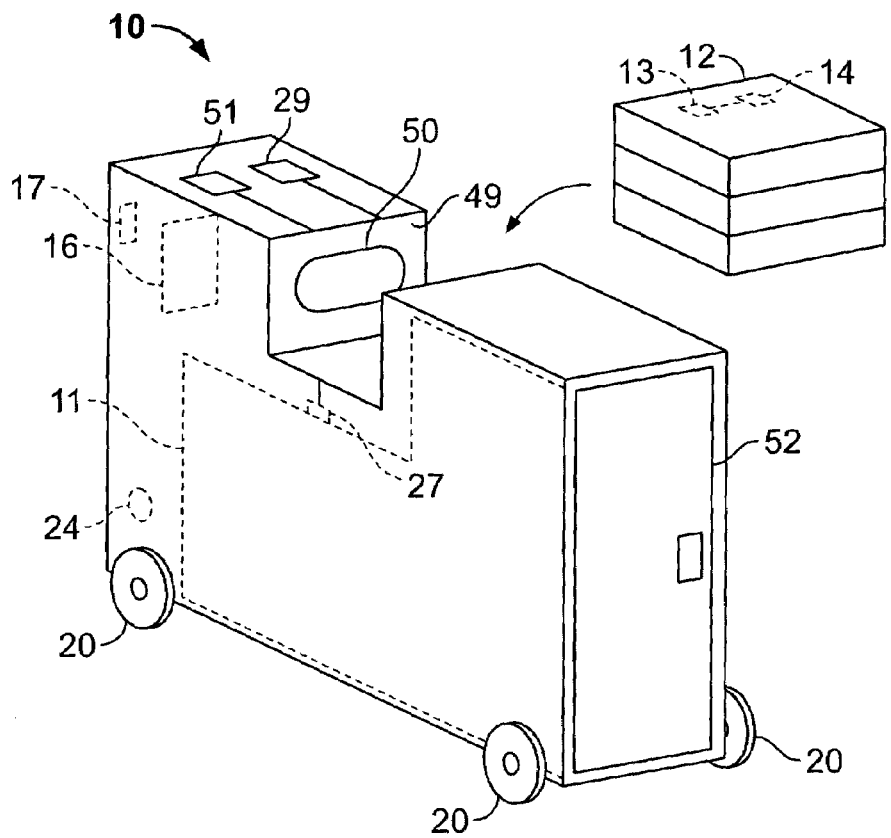
FIG. 1 illustrates a cart configured according to an embodiment of the invention.
Figure 2:
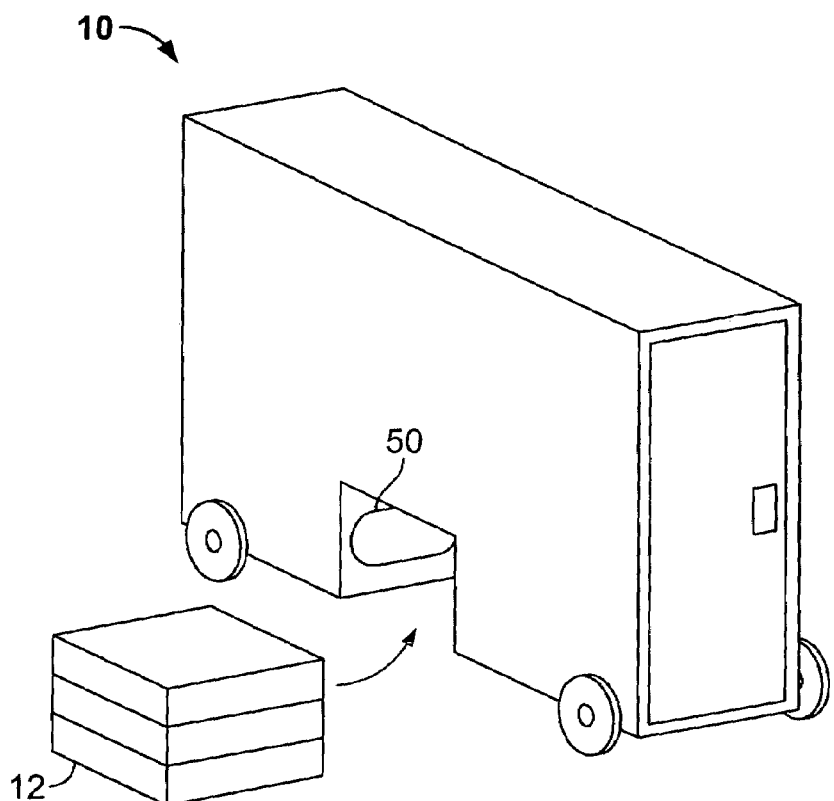
FIG. 2 illustrates a cart configured according to another embodiment of the invention.

Referring to FIG. 1, an embodiment of the cart will now be described. The cart, generally labeled 10, includes a compartment 11 for accommodating food, drinks, or items for sale. The compartment 11 may include racks for holding trays. The body of the cart is made primarily out of molded plastic or composite materials, and is insulated. The cart 10 also includes a mission module 12, which itself includes a processor 13 and a memory 14 communicatively linked to the processor 13. The cart 10 further includes a receptacle 49 that is configured to receive the mission module 12, a locking adapter 17, an external docking port 16 and an internal docking port 50. The external docking port 16 includes connections for receiving external power, transmitting and receiving, data, receiving air, receiving water, discharging waste air, and discharging waste water. A conduit runs from the external docking port 16 to the internal docking port 50. Lines for power, data, air, and water run through the conduit and connect to corresponding connections of the internal docking port 50. The mission module 12 also has appropriate connections for power, data, air, and water that marry to the connections of the internal docking port 50, thereby enabling the mission module 12 to receive external power, to transmit data out of the cart 10, to receive data from outside of the cart 10, to receive water, to discharge waste water, to receive air, and to discharge waste air. Possible implementations of the data connection of the external docking port 16 include a controller area network (CAN) interface. The data connection may be through direct contact using pins, or wireless (e.g., using infrared signals). As will be discussed below, not all of the connections of the internal docking port 50 and the external docking port 16 will necessarily be used for every possible mission of the cart 10. For example, if the cart 10 is on a hot food service mission and the mission module 12 has an oven, then there may only be a need for the mission module 12 to use the power, data, air, and waste air connections of the internal docking port 50, and the external docking port 16. In one embodiment, the external docking port 16 has an induction interface for receiving power inductively. The induction interface acts as a current source for the mission module when subjected to a strong magnetic flux, such as one generated by an external induction paddle. The cart 10 also includes wheels 20, which permit the cart 10 to be rolled. In the embodiment illustrated in FIG. 1, the mission module 12 is located at the top of the cart 10. In the embodiment of FIG. 2, it is located at the bottom of the cart 10. In some embodiments, the mission module 12 may be inserted or removed via the top of the cart 10. In other embodiments, the mission module 12 may be inserted from the side of the cart 10.

Referring still to FIG. 1, the cart 10 also includes a temperature sensor 27 for the compartment 11. The temperature sensor 27 is communicatively linked to the mission module 12. The temperature sensor 27 determines the temperature of the compartment 11 and transmits data regarding the temperature to the mission module 12, which stores that information in its memory. The cart 10 also includes a control panel 51 that is communicatively linked to the mission module 12, and includes an on/off switch and a digital readout that can display messages regarding the status of the cart 10. Finally, the cart 10 includes an RFID transceiver 29 that can interrogate RFID tags and recognize responses from those tags. The RFID transceiver 29 is communicatively linked to the mission module 12. In one embodiment of the invention, each of the food, beverage or duty free items carried in the cart 10 has an RFID tag. Whenever such an item is put in or taken out of the cart 10, the transceiver obtains the items identity code from the RFID tag. The identity codes of the items that are added to, taken from, or stored in the cart 10 are thereby obtained and stored in the mission module 12. The cart 10 may also have an RFID tag that uniquely identifies the cart. The RFID tag may be located at any point on the body of the cart.

Figure 3A:
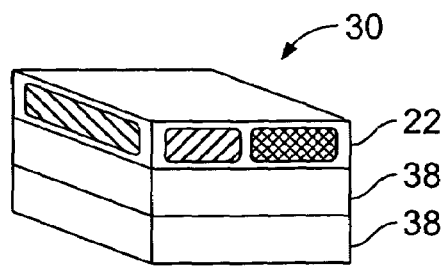
FIGS. 3A-3D illustrate possible implementations of the mission module.
Figure 3B:
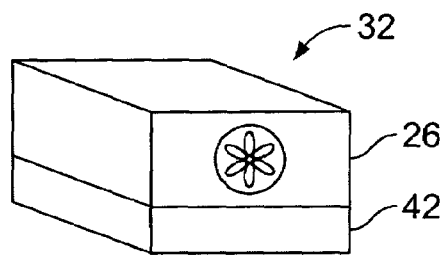
Figure 3C:
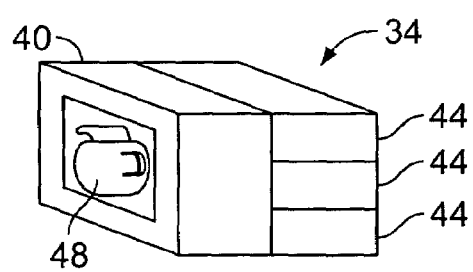
Figure 3D:
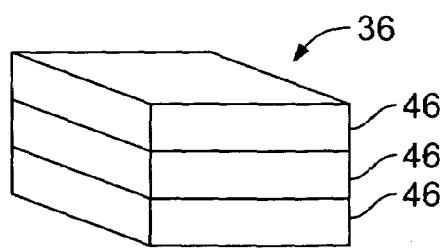

Referring to FIGS. 3A-3D, examples of possible implementations of the mission module 12 of FIGS. 1 and 2 will now be described. Each of these implementations includes the processor 13 and memory 14 shown in the FIG. 1. Additionally, each of these implementations includes power, data, air, and water connections that marry to the internal docking port 50, if required. FIG. 3A shows the mission module being implemented as a cold food service module 30. The cold food service module 30 includes a chiller unit 22, and tray compartments 38. When installed in the cart 10, the chiller unit 22 (e.g. a refrigerator) chills the compartment 11 (FIG. 1). FIG. 3B shows the mission module being implemented as a hot food service module 32. The hot food service module 32 includes a heating unit 26 and a tray compartment 42. The heating unit 26 (e.g., an over) heats the compartment 11 of the cart 10. FIG. 3C shows the mission module being implemented as a beverage service module 34. The beverage service module 34 includes a beverage preparation unit 40 (which may be a coffee, latte, or espresso maker), a carafe 48 and half-tray compartments 44. Finally, FIG. 3D shows the mission module being implemented as a dummy module 36, which may be used, for example, when the cart 10 does not require any particular functionality. The dummy module 36 includes tray compartments 46. Other mission modules are possible. For example, one possible mission module will carry out a franchising mission. Such a mission module may be decorated with brand colors and logos and may carry branded products (e.g., a cold beverage module decorated in the colors of a particular brand of beer having the beer itself stored inside). Additionally, mission modules may be customized. For example, if a customer wishes to have a mission module that includes a rice cooking function, then a mission module having a rice cooker may be specially built for that customer.

Figure 4:
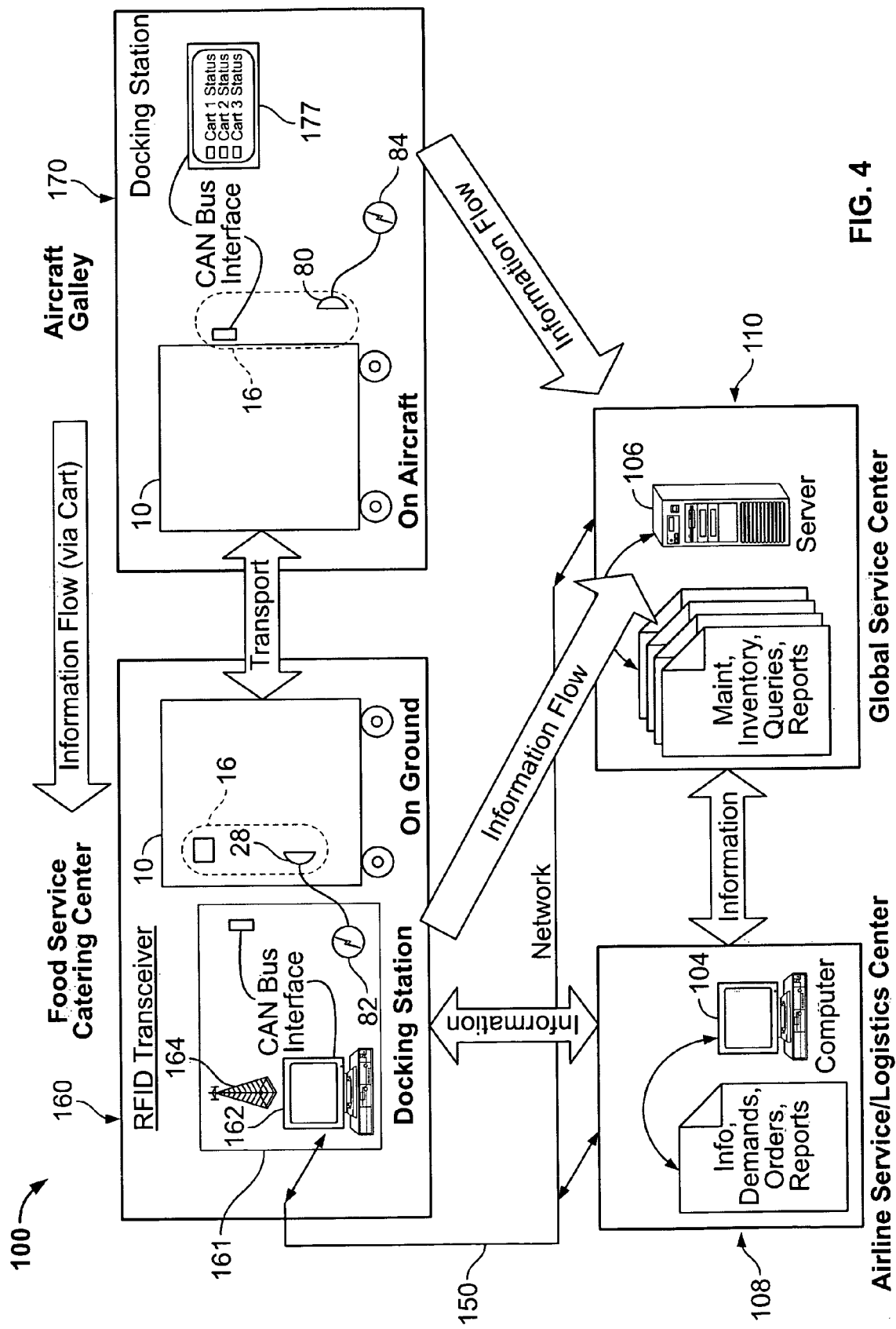
FIG. 4 illustrates an aircraft cabin service system that is set up according to an embodiment of the invention.

Referring to FIG. 4, an example of an aircraft cabin service system in which the cart 10 may be employed will now be described. The system, generally labeled 100, includes a food service catering center 160, an aircraft galley 170, an airline service/logistics center 108, and a global services center 110. Various parts of the system 100 communicate with one another via a network 150, which may be a private network or a public network (such as the Internet). The catering center 160 includes a docking station 161 that has a terminal 162, an RFID transceiver 164 communicatively linked to the terminal 161, a power supply 82, and an induction paddle 28 electrically connected to the power supply 82. The docking station 161 may also have a water supply, a waste water drain, air supply, and a waste air port. The docking station 161 has the appropriate connections for the external docking port 16 of the cart 10, thereby enabling the docking station 161 to supply the cart 10 with water, air, data, electricity, and to receive data, waste water, and waste air from the cart 10. In one embodiment, the catering center 160 includes an automated sanitizing station, which has the ability to power wash and disinfect the cart 10. When the cart 10 is at the food service center 160, the cart 10 is docked, sanitized, assigned a mission (or sent to storage until needed), and loaded with the appropriate products. Also while at the food service, the cart 10 may be linked to the docking station 161 via the external docking port 16. While at the docking station 161 (or at any docking station), the cart 10 transmits data to the docking station, including maintenance data, operational data, and financial data (e.g., how many hours the cart has been in use, which can be used in cases where the cart is being rented on an hourly basis). In one implementation, the cart 10 "dumps" the entire contents of its memory 14 to every docking station to which it is docked. The induction paddle 28 may be attached proximate to the external interface 16 of the cart 10, thereby permitting current to flow from the power supply 82 to the cart 10. In this embodiment, there may be many carts 10 in a fleet, each cart being capable of deployment on an aircraft in a fleet of aircraft.

The aircraft galley 170 includes a docking station 177, which has a wall mounted galley control panel that includes a user interface. When the cart 10 is on-board the aircraft, it can be communicatively linked to the docking station 177 via the external docking port 16 to enable the docking station 177 to input information into the memory 14 of the mission module 12 and to extract information from the memory 14. The docking station 177 of the aircraft galley 170 also includes a power supply 84, and an induction paddle 80 electrically connected to the power supply 84. The induction paddle 80 may be attached proximate to the external docking port 16 of the cart 10, thereby permitting current to flow from the power supply 84 to the cart 10. The docking station 177 may also have a water supply, a waste water drain, air supply, and a waste air port. The docking station 177 has the appropriate connections for the external docking port 16 of the cart 10, thereby enabling the docking station 177 to supply the cart 10 with water, air, data, electricity, and to receive data, waste water, and waste air from the cart 10. The docking station 177 also has a locking mechanism that is coupled to the locking adapter 17 of the cart 10 to lock the cart in place during flight. While on the aircraft, the cart 10 is used to serve food and beverages, and to sell duty-free items to passengers. The docking station 177 may also be communicatively linked to the communication infrastructure of the aircraft. As the aircraft transmits flight data from the air to the ground, the telemetry in which the flight data is contained may also include data that has been extracted from the memory 14 of the cart 10. The extracted data may then be transmitted to the global service center 110.

The logistics center 108 includes a computer 104. The computer 104 executes software that determines what items need to be ordered to properly stock the fleet of carts 10 for anticipated trips that will be taken by the aircraft that are to be serviced. The global service center 110 includes a server 106, which executes software for tracking the carts all over the various airports being serviced. The terminal 162 of the catering center 160 communicates with both the logistics center 108 and the global service center 110 via the network 150. For example, the terminal 162 transmits status reports to the computer 108 of the logistics center 108, and transmits maintenance and inventory reports to the server 106 of the global service center 110. The logistics center 108 and the global service center 110 receive maintenance data, operational data, and financial data regarding the carts via the network 150. The operational data may include data regarding the location of each cart. Such location data may be generated whenever a cart docks at a docking station (i.e., the docking station will report the presence of the cart at its location) or whenever the RFID circuit of the cart is transmits the identity of the cart in response to being interrogated. For example, if the cart is used to serve passengers on an airline, there may be RFID transceivers at various locations in the airport. As the cart is transported to its designated aircraft, for example, it may pass near the jetway, be interrogated by an RFID transceiver on the jetway, and transmit its identity in response. The RFID transceiver (which is communicatively linked to the network 150) then transmits the location data to the logistics center 108 and the global service center 110 via the network 150. Computers at these centers will then record the date and time that the cart was detected at the jetway.

Figure 5:
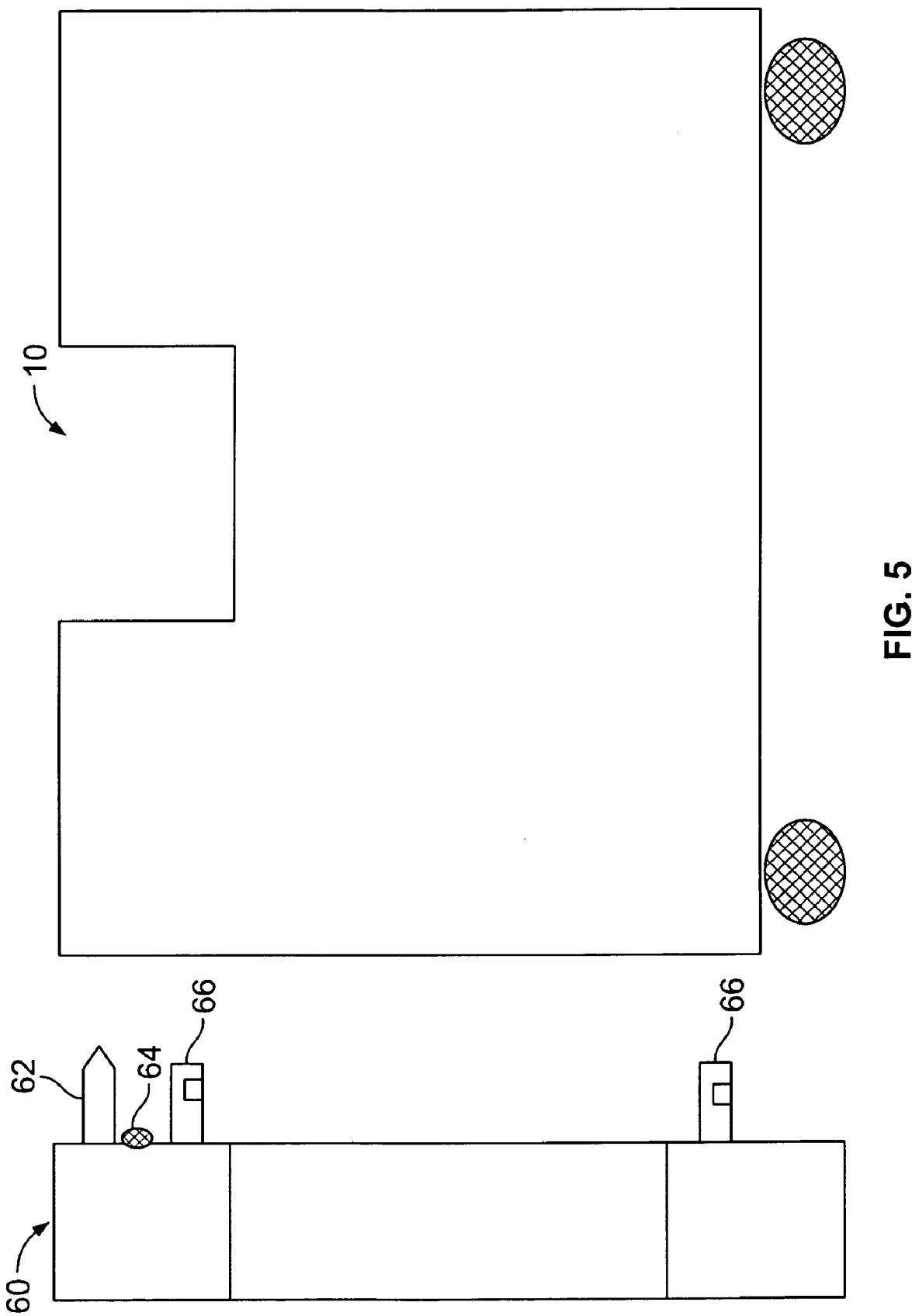
FIGS. 5-7 illustrate a docking station for the mobile cart in accordance with an embodiment of the invention, with FIG. 5 being a side view, FIG. 6 being an elevated view, and FIG. 7 being a top view.
Figure 6:
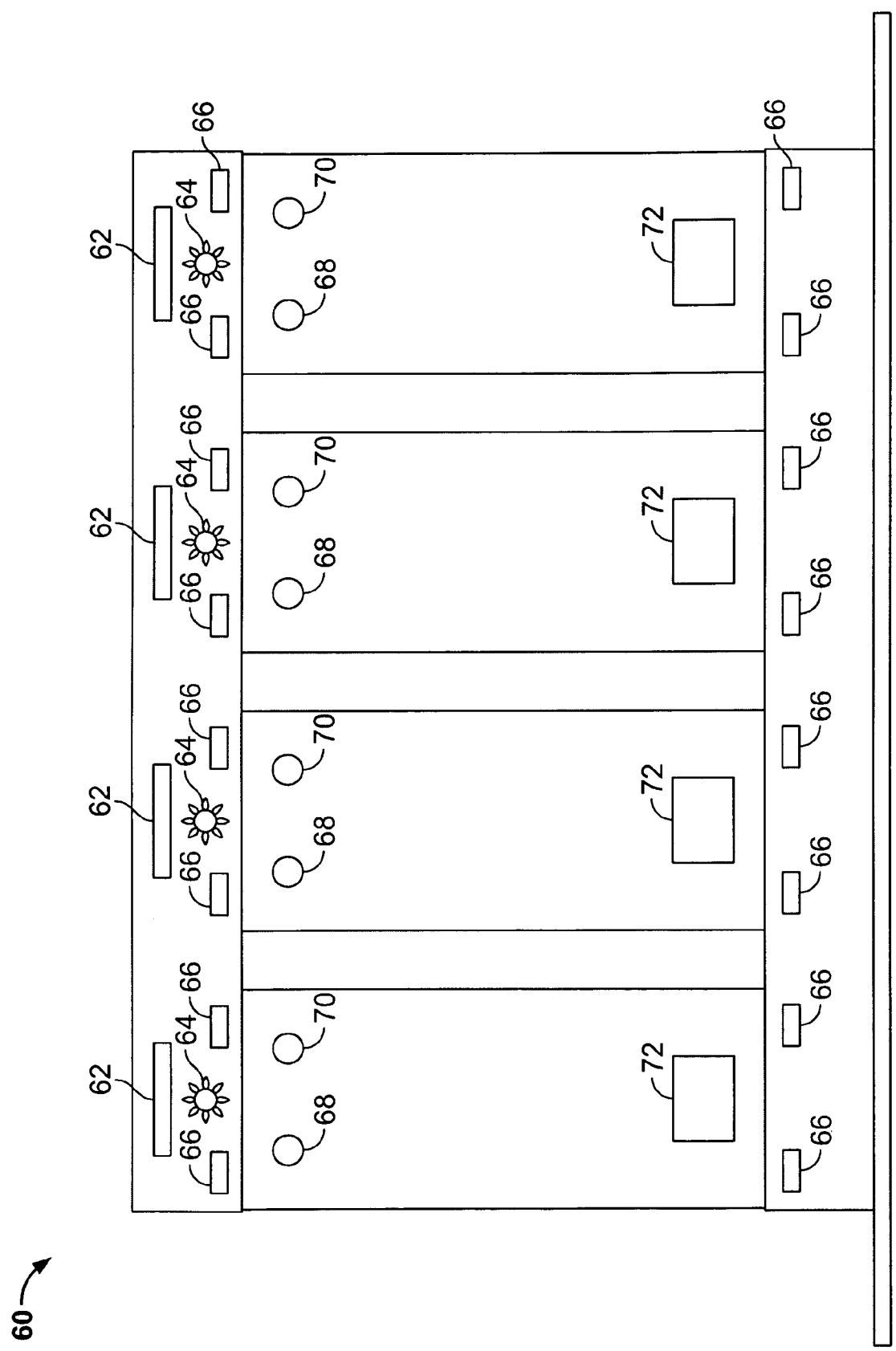
Figure 7:
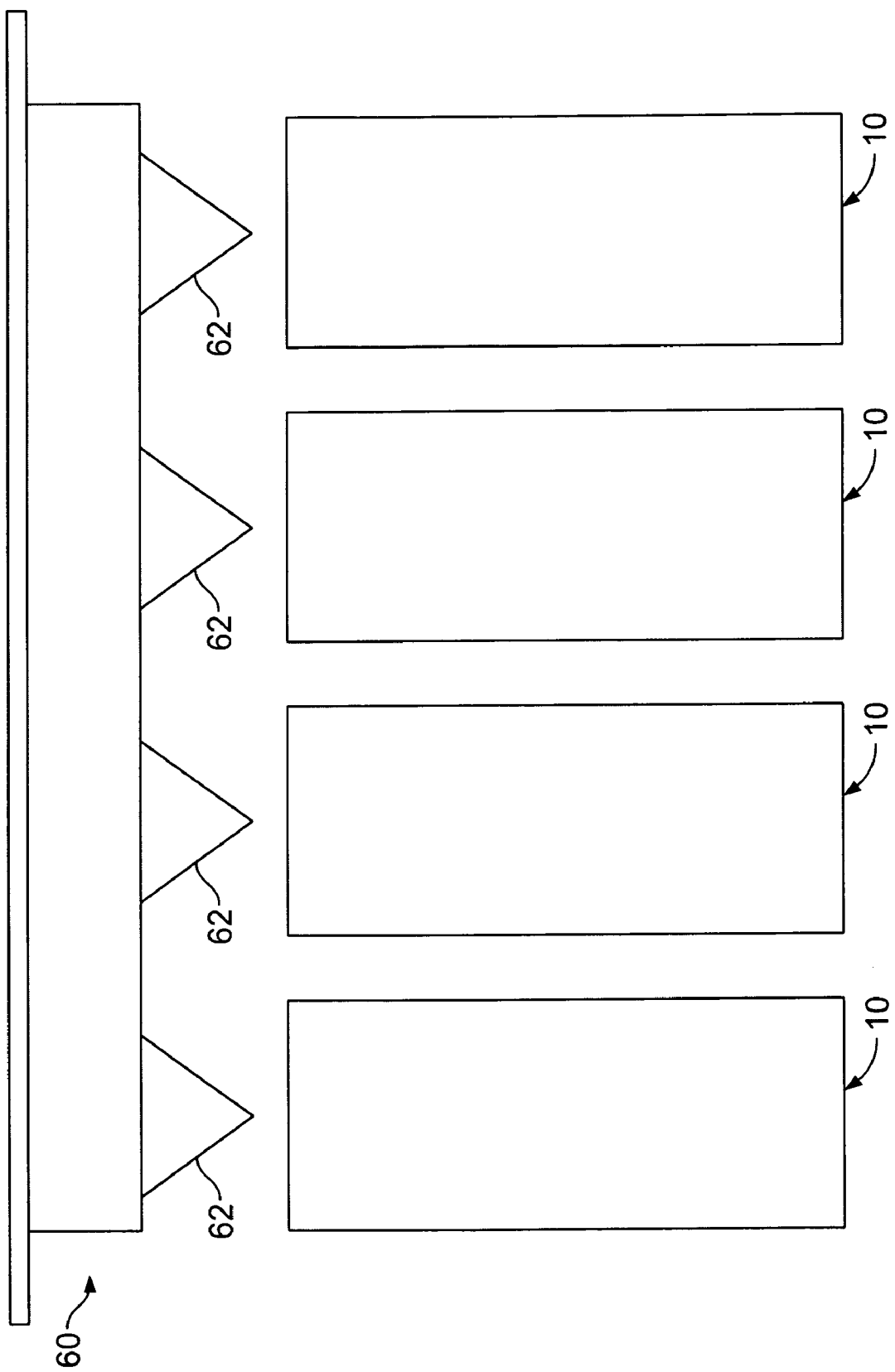
Figure 8:
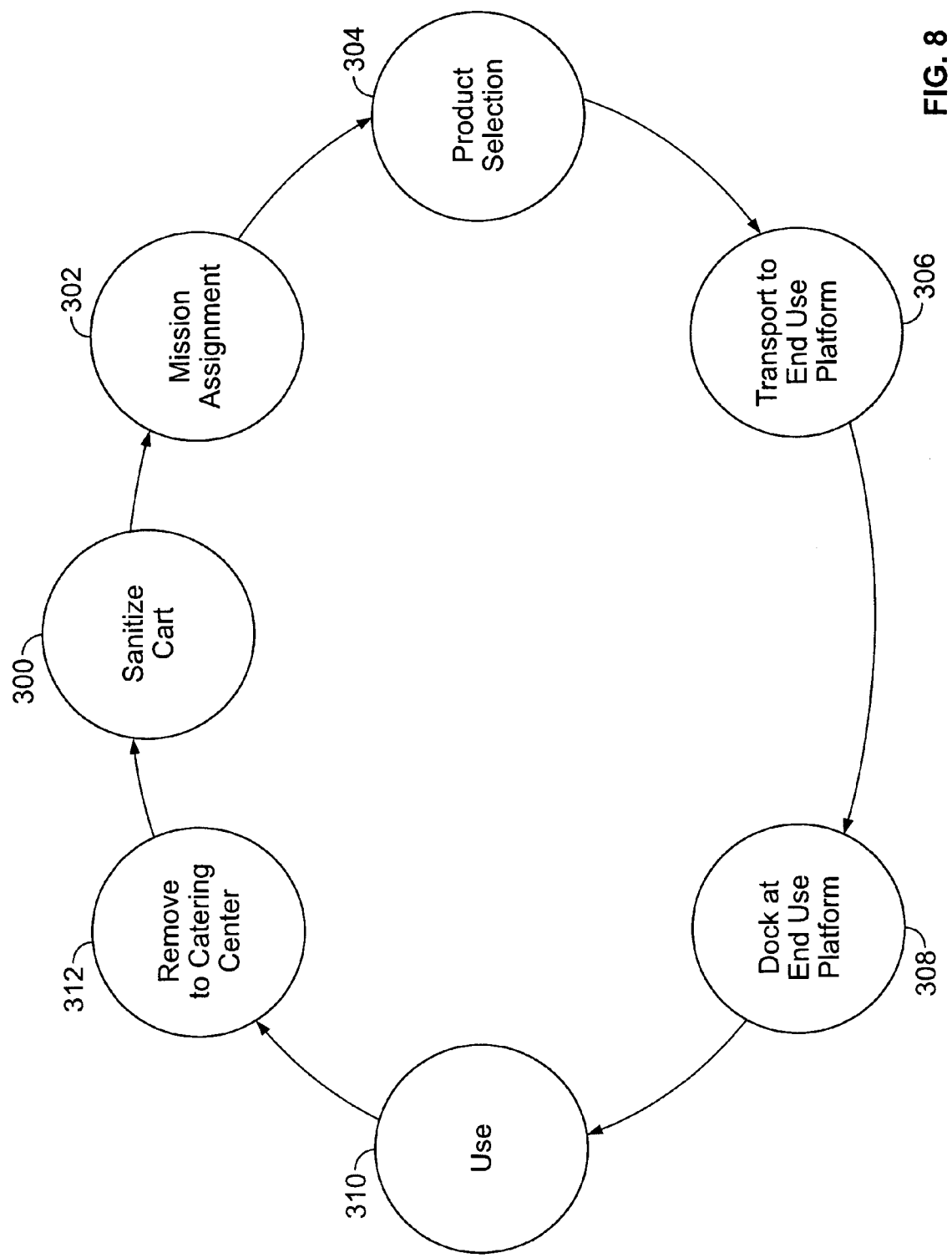
FIG. 8 is a flow diagram showing the disposition of the mobile cart during the catering process according to an embodiment of the invention.

Referring to FIGS. 5-7, an example of a docking station for the cart 10 (FIGS. 1, 2, and 4) will now be described. The docking stations 161 and 177 of FIG. 4 may be implemented in this manner. The docking station, generally labeled 60, can accommodate multiple carts. It includes power induction paddles 62 for providing power to the carts, infrared transceivers 64 for enabling data communication with the carts, and locks 66. The locks 66 mechanically cooperate with the locking adapters 17 (FIG. 1) of the carts 10 to lock the carts 10 in place. The docking station 60 further includes air ports 68, which provide air to the carts 10, water ports 70, which provide water to the carts 10, and a waste port 72, which receives waste air and waste water from the carts 10.

In an embodiment of the invention, the cart 10 (FIG. 1) goes through a catering cycle during use. In this cycle, the cart is sanitized, assigned a mission, stocked with products, transported to a delivery platform (such as an aircraft, train, public area, hotel, or bus), docked at the delivery platform, used for cabin service, and returned to a catering center. Referring to FIG. 5, with appropriate references to FIGS. 1 & 4, the tasks performed at each step in the cycle in an embodiment of the invention will now be described in more detail.

At step 300, the cart 10 is sanitized and information regarding the sanitization is input into the processor 13 of the mission module 12, extracted from the mission module 12 and transmitted back to an appropriate coordination center, such as the logistics center 108. This information may include the identity (e.g., serial number) of the cart, the fact that the cart 10 entered the sanitizing station which, in one embodiment, is located at the food service catering center 160 (FIG. 4), the time it entered, the time the sanitization was completed and the time the cart left the sanitizing station, the temperature in which the cart 10 was sanitized, the duration of the sanitation process, and any notes regarding the sanitation process (such as what chemicals, if any, were used).

At step 302, which is performed at the food service catering center 160 in one embodiment, the cart 10 is assigned a mission. Possible mission assignments include hot cart, cold cart;, beverage cart, duty free cart, a franchising mission, and a customized mission. The mission module 12 that is appropriate to the assigned mission is then inserted into the cart 10 (e.g., any of the mission modules described in conjunction with FIGS. 3A-3D). Another operation that can be performed at step 302 is verification of the operational status of the cart 10. The results of the verification process may be stored in the processor 13 of the mission module 12 and/or transmitted to the logistics center 108 and the global service center 110. At step 304, products that are to be carried by the cart 10 are selected and loaded onto the cart 10. Using the example of an airline implementation, each leg of an airline flight, may be a different duration than other legs, thereby requiring different products (e.g., a short leg may require snacks while a long leg may require a hot meal). As part of the product selection process, information may be retrieved from, and entered into the processor 13 of the mission module 12. Once the products are selected and loaded onto the cart 10, information regarding the loaded products may then be input into the processor 13 of the mission module 12. This can be done automatically using an RFID transceiver on the mission module 12 to query the RFID tags on the products before, during, or after they are loaded onto the cart 10. The identification number of each queried product is then stored in the processor 13 of the mission module 12 and, if desired, transmitted to the logistics center 108 and the global service center 110. After the cart 10 is loaded with the appropriate products, the cart 10 is loaded onto a transport at step 306. The transport 116 may be any mode of transportation, such as a wheeled vehicle. During transportation, the cart 10 may be docked at a docking station on the transport 116, at which it can receive power, water, air, connectivity (e.g., to the network 150). The cart 10 may report its location to the appropriate coordination center, such as the service center 108 and the logistics center 110. Thus, with a sufficient number of networked RFID transceivers deployed throughout path that the cart takes in the catering process, it would be possible for any node on the network 150 to be able to determine where any cart is at any particular time.

At step 308, the cart 110 is then brought to the end use platform. The end use platform is the locale at which the cart 10 is to be deployed. Possible implementations of the platform include an aircraft, train, bus, hotel, or public area such as a sidewalk. When used in conjunction with the system 100 depicted in FIG. 4, the end use platform is a passenger aircraft. While at the end use platform, the cart 10 may be docked at a docking station and remain docked until circumstances require that it be undocked (e.g., if the cart needs to be rolled down the aisle of a passenger aircraft for in-flight meal service). The docking station may retrieve information from the processor 13 of the mission module 12 of the cart 10, including current and past temperature information (enabling, for example, the catering service or, the cabin crew to determine whether food has been kept at temperature that complies with the appropriate regulations), and inventory information (e.g., based on the identities obtained via an RFID transceiver). At step 310, the cart 10 is used to cater to customers. At step 312, the cart 10 is removed from the end use platform and transported to a catering center.

It can be seen from the foregoing that a new and useful mobile cart for serving food and beverages has been described. The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

We claim:

1. A mobile catering cart comprising:
    a body including a compartment within the body for storing items, and a depression defined on a surface of the body;
    a removable module configured for insertion into the depression, the removable module making the mobile catering cart operable for a mission when the removable module is inserted into the depression, the removable module including
        a memory storing information regarding the mission, and
        a processor that retrieves the information and transmits the information to a docking station that is separate from the mobile catering cart;
    a first docking port on another surface of the body, the first docking port being configured to mate with the docking station for receiving power, data and mission-specific fluid from the docking station; and
    a second docking port in the depression, the second docking port being in electrical and fluid communication with the first docking port for providing the power, data and mission-specific fluid to the removable module.

2. The cart of claim 1, further comprising a temperature sensor for detecting the temperature of the compartment, wherein the information stored in the memory further comprises the detected temperature.

3. The cart of claim 1, wherein the removable module comprises a cooling unit that cools items stored in the compartment.

4. The cart of claim 1, further comprising a transceiver that queries identification tags of items stored on the cart, the transceiver being communicatively linked to the mission module, wherein the information stored in the memory further comprises data identifying the items.

5. The cart of claim 1, wherein the first docking port comprises an induction port that receives energy induced by an induction device that is external to the cart and delivers electrical current to the removable module.

6. The cart of claim 1, further comprising:
a temperature sensor that detects the temperature of the compartment; and
a radio frequency identification transceiver that queries radio frequency identification tags of items stored on the cart to obtain their identity;
wherein the information stored in the memory farther comprises data regarding the temperature detected by the sensor, data regarding the obtained identity of the items, and data regarding a sanitation procedure performed on the cart.

7. The cart of claim 1, wherein the first and second docking ports comprise a connection for water.

8. The cart of claim 1, wherein the first and second docking ports comprise a connection for air.

9. The cart of claim 1, wherein the removable module comprises a heating unit that heats items stored in the compartment.

10. The cart of claim 1, wherein the removable module comprises a beverage unit for preparing and serving beverages, the beverages being made from the mission-specific fluid.

11. The cart of claim 1, wherein the removable module comprises a franchising module for advertising and distributing branded products.

12. The cart of claim 1, wherein the removable module is one of a plurality of removable modules, each removable module being adapted for a different mission for the cart.

13. A catering system comprising:
a docking station including a power source, a data interface, and a fluid interface;
a food and beverage cart comprising a body including a compartment within the body for storing items, a depression defined on a surface of the body,
a removable module configured for insertion into the depression, the removable module making the mobile catering cart operable for a mission when the removable module is inserted into the depression, the removable module including a processor and a memory communicatively linked to the processor, the memory storing information regarding the mission,
a first docking port on another surface of the body, the first docking port being configured to mate with the docking station for receiving power, data and at least one mission-specific fluid from the power source, data interface and fluid interface respectively, and a second docking port in the depression, the second docking port being in electrical and fluid communication with the first docking port for providing the power, data and mission-specific fluid to the removable module;
a computer located remotely from the docking station;
a computer network, the docking station and the computer being communicatively linked to the network, the docking station receiving the information from the memory via the first and second docking ports and transmitting the information to the computer via the computer network.

14. The system of claim 13, wherein the cart further comprises a temperature sensor that detects the temperature of the compartment, the transmitted information comprising data regarding the detected temperature.

15. The system of claim 13, wherein the cart further comprises a radio frequency identification transceiver that queries radio frequency identification tags of items that are stored in the cart, the transmitted information comprising data regarding the responses received by the radio frequency identification transceiver.

16. The system of claim 13, wherein
the first docking port comprises an induction interface that is electrically connected to the removable module,
the power source comprises an induction paddle, and
the induction paddle inducing current to flow from the docking station to the removable module when the cart is docked at the docking station.

17. The system of claim 13, wherein the information transmitted to the remote computer includes data regarding the operational status of the cart, the maintenance history of the cart, and data regarding which items have been provided to passengers from the cart.

18. The system of claim 13, wherein the docking station transmits maintenance data to the memory of the removable module via the docking port, the maintenance data comprising data regarding a sanitation procedure performed on the cart.

19. The system of claim 13, wherein the removable module comprises a cooling unit that cools items stored in the compartment.

20. The system of claim 13, wherein the removable module is one of a plurality of removable modules, each removable module being adapted for a different mission for the cart.

21. The system of claim 13, wherein the removable module is a heating unit that heats items stored in the compartment.

22. The system of claim 13, wherein the removable module is a unit that prepares beverages from the mission-specific fluid.

23. The system of claim 13, wherein the removable module comprises a franchising module for advertising and distributing branded products.

* * * * *